(12) United States Patent
Sames

(10) Patent No.: US 7,775,861 B2
(45) Date of Patent: Aug. 17, 2010

(54) METHOD OF AND APPARATUS FOR REDISTRIBUTION OF PASTY FILLING MATERIAL

(75) Inventor: Jörg Sames, Buseck (DE)

(73) Assignee: Poly-Clip System GmbH & Co. (DE)

(*) Notice: Subject to any disclaimer, the term of this patent is extended or adjusted under 35 U.S.C. 154(b) by 221 days.

(21) Appl. No.: 11/609,955

(22) Filed: Dec. 13, 2006

(65) Prior Publication Data
US 2007/0149100 A1    Jun. 28, 2007

(30) Foreign Application Priority Data
Dec. 16, 2005  (DE) ............ 10 2005 060 328

(51) Int. Cl.
*A22C 11/00* (2006.01)
(52) U.S. Cl. ........................................... 452/32
(58) Field of Classification Search ............ 452/21–35, 452/37, 38, 46–48, 51
See application file for complete search history.

(56) References Cited

U.S. PATENT DOCUMENTS

| | | | | |
|---|---|---|---|---|
| 2,070,850 A | * | 2/1937 | Trabold | 99/349 |
| 2,134,862 A | * | 11/1938 | Dunnam | 53/526 |
| 3,540,075 A | * | 11/1970 | Menne et al. | 452/47 |
| 3,693,533 A | | 9/1972 | Liepa | |
| 4,021,885 A | | 5/1977 | Muller | |
| 4,112,546 A | | 9/1978 | Muller | |
| 4,434,528 A | * | 3/1984 | Niedecker | 452/37 |
| 5,147,239 A | * | 9/1992 | Staudenrausch | 452/47 |
| 5,468,179 A | * | 11/1995 | Stanley et al. | 452/37 |
| 5,885,150 A | | 3/1999 | Whittlesey | |
| 6,558,241 B2 | * | 5/2003 | Hergott et al. | 452/31 |
| 7,254,929 B1 | * | 8/2007 | Schutz et al. | 53/450 |
| 2002/0083848 A1 | | 7/2002 | Mueller et al. | |
| 2003/0096567 A1 | | 5/2003 | Staudenrausch et al. | |

FOREIGN PATENT DOCUMENTS

| | | |
|---|---|---|
| AT | 337 563 B | 7/1977 |
| DE | 2 210 054 A | 9/1973 |
| DE | 24 02 817 A1 | 7/1975 |
| DE | 31 21 101 C1 | 11/1982 |
| DE | 100 55 310 C2 | 7/2003 |
| EP | 1 174 035 A1 | 1/2002 |
| WO | 94/07370 A1 | 4/1994 |

OTHER PUBLICATIONS

European Search Report mailed May 3, 2007.

* cited by examiner

*Primary Examiner*—Thomas Price
(74) *Attorney, Agent, or Firm*—Hahn Loeser & Parks LLP; Louis F. Wagner

(57) ABSTRACT

The invention concerns a method of and an apparatus for redistribution of pasty filling material in a closed, individually separated packaging casing in tube or bag form. At least two conveyor belts form between mutually facing first belt portions a through-passage cross-section which is of such a dimension that, when the packaging casing is conveyed through the through-passage cross-section, the filling material is distributed substantially over the entire length of the closed packaging casing in tube or bag form. The invention further concerns a manufacturing installation in which such a redistribution apparatus is disposed upstream of a closure device for dividing off a sausage, closing it by means of closure clips and individually separating the closed sausage.

8 Claims, 2 Drawing Sheets

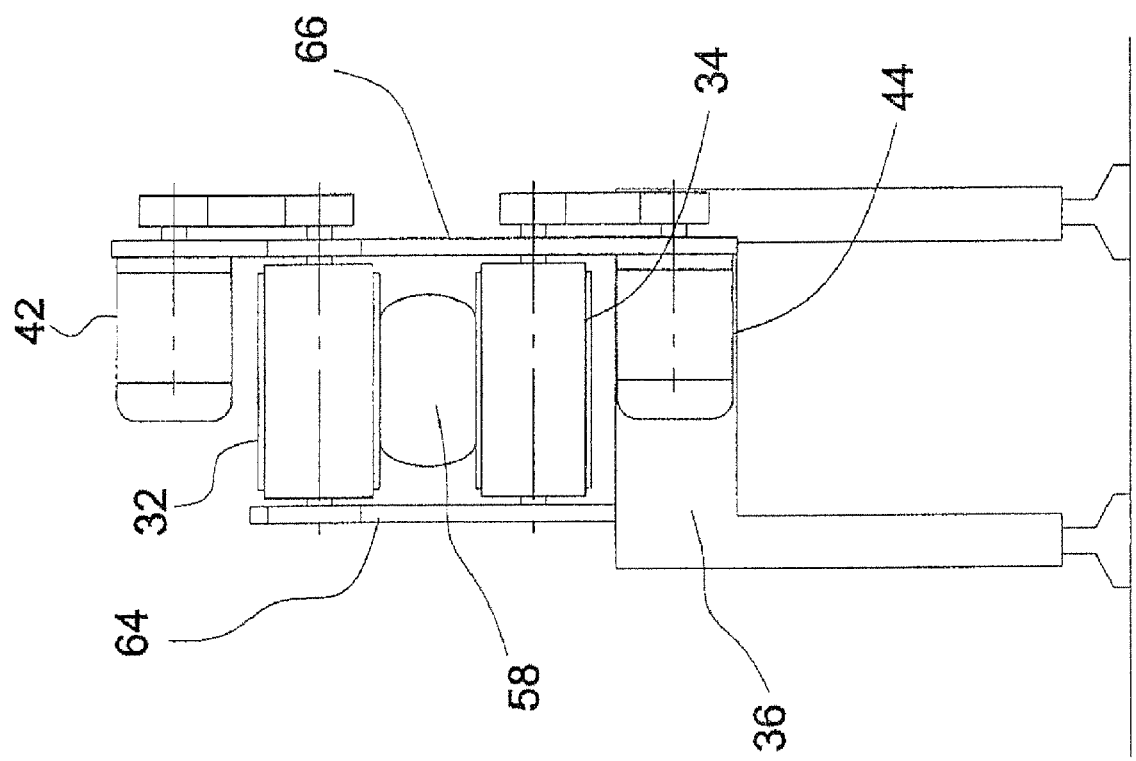

METHOD OF AND APPARATUS FOR REDISTRIBUTION OF PASTY FILLING MATERIAL

This patent application claims priority to German patent application DE 10 2005 060 328.9-27, filed Dec. 16, 2005, hereby incorporated by reference.

TECHNICAL FIELD

The invention concerns a method of and an apparatus for redistribution of pasty filling material in a closed, individually separated packaging casing in tube or bag form. It further concerns a manufacturing installation for sausages filled (loosely) with pasty filling material comprising a filling pipe through which the filling material can be introduced into a packaging casing in tube or bag form which is fed over the outer periphery of the filling pipe, and a closure device arranged downstream of the filling pipe mouth opening for dividing up a sausage and closing it by means of closure clips and individually separating the closed sausage from the filled packaging casing.

BACKGROUND OF THE INVENTION

As is known in such manufacturing installations the filling material is introduced by means of a filling apparatus under pressure into the filling pipe connected thereto and transported or guided in the filling pipe to the closure device. The filling pipe also carries and guides the packaging casing to the closure device, on the outer periphery of the filling pipe. The filling material issues from the filling pipe from the mouth opening thereof which is disposed in the proximity of the closure device and is thus introduced into the tubular casing which has been previously closed at one end by means of a closure clip, or into the packaging casing in bag form. When a predetermined or desired portion size is reached, the closure device divides a sausage from the filled tubular casing by constricting it locally to produce a plaited end portion on the tubular casing by means of constriction elements. In this respect sausage denotes not a given content (for example foodstuff) but the shape of the end product, which is governed by the manufacturing procedure involved. Then, in the region of the plaited end portion of the tubular casing, two axially displaced closure clips are fitted around the tubular casing and closed by means of closure tools (female die and punch member). Thereafter the tubular casing is severed between the two closure elements by means of a blade and the closed sausage is individually separated off.

As an alternative to the above-discussed manufacturing installation with a closure device, for example DE 100 55 310 discloses a manufacturing installation with a twisting device for closing sausages, downstream of which is disposed a length-dimensioning unit for controlled removal of the twisted sausages. In that situation a uniform pull is exerted on the line of sausages which are connected to each other, by means of two conveyor belts which are synchronized with the filling process in order to achieve a uniform length for all sausages independently of the filling material discharge procedure.

The purpose of the apparatus set forth in the opening part of this specification or the method set forth in the opening part of this specification for redistributing pasty filling material in a packaging casing produced in that way is in contrast to produce sausages with a freely selectable and in particular non-round cross-section. For that purpose it is necessary for the packaging casing which is generally of a round cross-section to be filled not chock-full but loosely, that is to say only partially with filling material, for example sausage meat or the like. It is only when the packaging remains loose that it can then be deformed. A loose packaging is produced in known manner by means of a closure device in which division takes place on the basis of the principle of spreading displacement. In that case the constriction or displacement elements are firstly brought together radially with respect to the packaging casing in a scissor-like movement in order to constrict the casing. Then they are moved axially away from each other in order to increase the length of the constriction region and in that way to produce an unfilled packaging casing portion into which the filling material can be redistributed after the closure step.

In order to produce a sausage of the desired cross-section the loose packaging casing is introduced into a shaping box. For that purpose however the filling material must firstly be distributed as uniformly as possible over the entire length of the packaging casing as otherwise it cannot be pressed into the shaping box. The redistribution operation is effected by hand. As many sausage products are filled with a filling material which is very tough and contains in part fibrous and/or non-flowing constituents, redistribution of the filling material in the packaging casing is a very strenuous process which requires a great deal of manual strength. Added to that is the fact that such sausage products are of a high weight which must be moved by the workers. Automation in that processing stage is not known.

SUMMARY OF THE INVENTION

Therefore an object of at least one embodiment of the invention is to provide an apparatus for and a method of redistributing pasty filling material in a closed packaging casing in tube or bag form in order to avoid the strenuous manual work and to make the sausage manufacturing process more efficient.

In one embodiment, that object is attained by an apparatus of the kind set forth in the opening part of this specification comprising at least two conveyor belts having mutually facing first belt portions so that a through-passage cross-section is formed between the first belt portions and a drive for the conveyor belts which is adapted to drive them with the mutually facing belt portions substantially synchronously in the conveyor direction.

The object is further attained by a method of the kind set forth in the opening part of this specification comprising the steps of introducing the closed packaging casing filled with pasty filling material into an arrangement of at least two such conveyor belts, and conveying the packaging casing through a through-passage cross-section which is formed between the first belt portions and which is of such a dimension that in the conveying operation the filling material is distributed substantially over the entire length of the closed packaging casing of tube or bag form.

In another embodiment of the redistribution apparatus, the conveyor belts are positionable relative to each other in such a way that the through-passage cross-section narrows in the conveyor direction. That provides that the packaging casing is not squeezed abruptly into the definitively desired shape, but gradually, so that the filling material has more time to flow into the initially empty portion of the packaging casing. The risk of the packaging casing bursting during the operation of re-shaping it is reduced in that way.

In another embodiment of the redistribution apparatus, an entry region of the conveyor belts is enlarged in relation to the through-passage cross-section and narrows in the conveyor direction to the through-passage cross-section. The entry region provides that a supplied sausage is reliably introduced, particularly when an automatic feed is involved, and is reliably taken over by the redistribution apparatus. Depending on the respective degree of the re-shaping effect and the caliber of the packaging casing, it may be sufficient for the guide rollers at the feed end of the conveyor belts to be of a sufficiently large diameter so that the conveyor belts engage the packaging casing with a tangential portion which forms a sufficiently acute angle to ensure that the packaging casing is securely gripped. In another configuration the conveyor belt has second belt portions which are disposed in front of the first belt portions (entry belt portions). They converge at an angle which is greater than the angle between the first belt portions—if the conveyor belts are in fact positioned in mutually angled relationship in the region of the first belt portions—and they are therefore of a narrowing through-passage cross-section and thus form an entry funnel configuration.

In one embodiment, the conveyor belts may be arranged on a common carrier structure, wherein at least one of the conveyor belts is held by at least two carrier elements which are displaced in the conveyor direction and which are displaceable independently transversely with respect to the conveyor direction and by means of which both the through-passage cross-section and also the angular position of the conveyor belts relative to each other can be varied. By means of the independently displaceable carrier elements, the conveyor belts can be displaced relative to each other selectively in the entry region, in the exit region or in both regions at the same time. In that way, both the through-passage cross-section and also the positioning angle of the conveyor belts, in particular in the region of their first belt portion, can be adjusted to the shape and the caliber of the sausage and/or the flow properties of the filling material.

The redistribution apparatus according to the invention can either be operated in a stand-alone situation, in which case the filled packaging casing is fed for example by hand or by way of a feed conveyor belt. That mode of operation substantially saves on the strenuous manual redistribution operation.

In the manufacturing installation referred to in the opening part of this specification the apparatus for redistributing the filling material, in accordance with one of the foregoing configurations, is arranged in accordance with the invention downstream of the closure device.

The manufacturing installation represents a higher stage of automation, in respect of which the redistribution apparatus is incorporated into the manufacturing process so that the closed, loosely filled packaging casing is removed directly or indirectly from the closure device and then re-shaped. In that respect care is to be taken to ensure that the conveyor belts do not unintentionally pull on the packaging casing before the sausage is closed and separated off. That is achieved for example by a sufficient spacing for the redistribution apparatus in relation to the closure device, which spacing is greater than the desired product length. It is known that the individually separated sausage is delivered by way of an inclined chute, the end of which, in a manufacturing installation according to the invention, can then open for example into the redistribution apparatus. Synchronization between filling material discharge or closure device and the conveyor belts of the redistribution apparatus is then no longer an important consideration, and that simplifies the production procedure. The automatic feed and introduction of the packaging casing means that no physical force has to be applied.

In another embodiment of the invention, a transport belt for conveying away and feeding the closed sausage is incorporated between the closure device and the apparatus for redistributing the filling material. The transport belt and the redistribution apparatus according to the invention may be aligned with each to ensure a more accurate feed and transfer of the sausage. As such a transport belt is often already to be found in known closure devices, for conveying away a finished closed and individually separated sausage, this development of the manufacturing installation represents a modular structure of known manufacturing installations, in which the redistribution apparatus can be included if required, that is to say in the production of shapeable sausage products, and can otherwise be removed.

In another embodiment, the manufacturing installation has a shaping box for shaping the sausage, which is disposed downstream of the apparatus for redistribution of the filling material. After the packaging casing has been redistributed to the desired through-passage cross-section over the entire length of the packaging casing in the redistribution apparatus according to the invention, it now passes into the shaping box without involving the application of a relatively large amount of force. It can be introduced for example automatically or manually into the shaping box. After the packaging is fitted into the shaping box the filling material enclosed by the packaging casing is typically once again distributed uniformly in the shaping box and pressed into shape by means of a cover and stabilized by cooking so that it retains its shape even after being removed from the shaping box.

BRIEF DESCRIPTION OF THE DRAWINGS

Further advantages of the invention will be described in greater detail by means of an embodiment by way of example with reference to the drawings in which:

FIG. 2 shows a diagrammatic view in cross-section through the conveyor belts in the region of the first belt portions in a plane perpendicular to the conveyor direction.

DETAILED DESCRIPTION OF THE DRAWINGS

Figure 1:
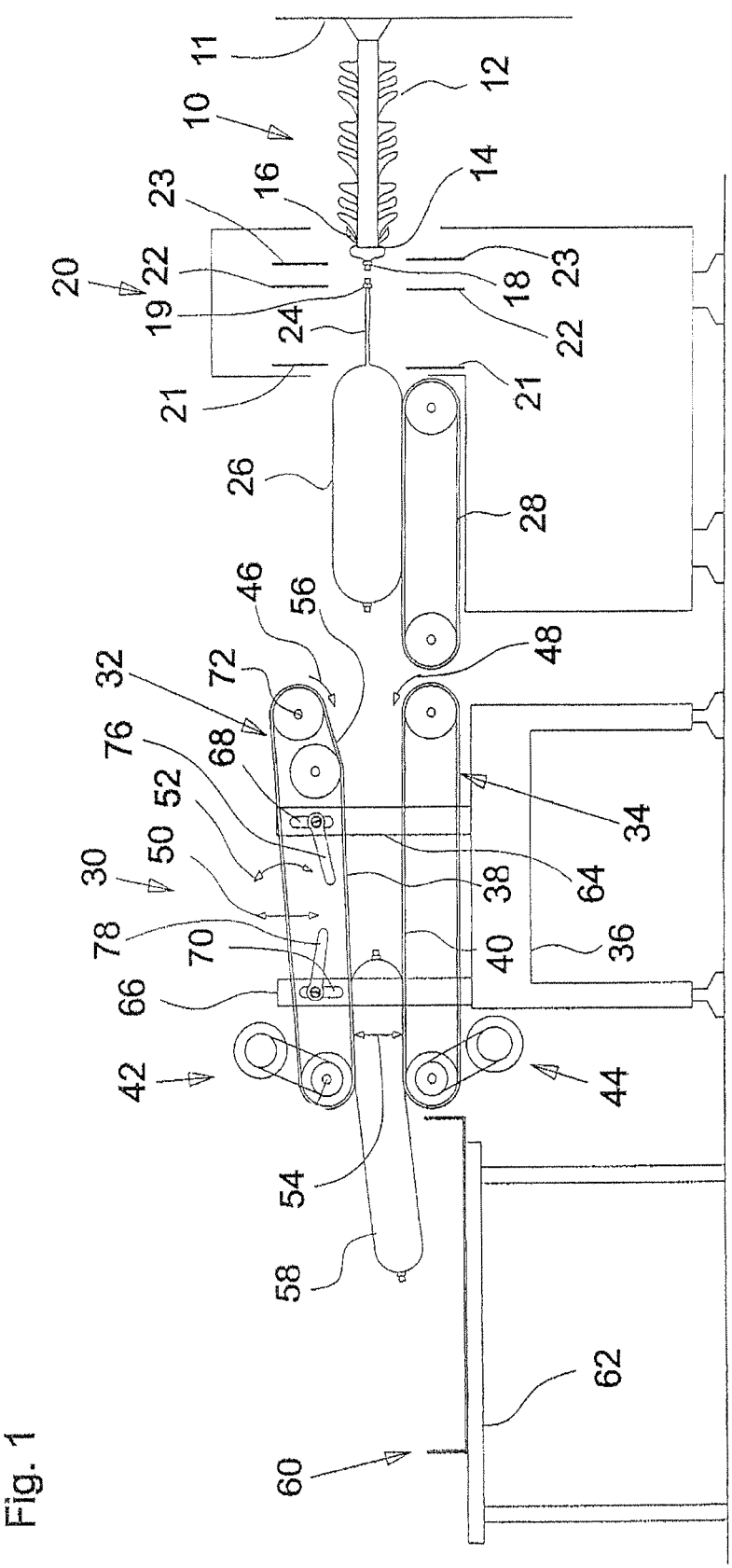
FIG. 1 shows a diagrammatic view of a manufacturing installation with an apparatus according to the invention for the redistribution of pasty filling material.

Referring to FIG. 1, the manufacturing installation according to the invention has a filling pipe 10, a closure device 20 adjoining it downstream thereof, an apparatus 30 for redistribution of the filling material according to the invention which is arranged further downstream, and a shaping box 60 set up downstream thereof for receiving the packaging casing with redistributed filling material.

The filling pipe 10 is mounted at its connection end by a flange mounting to a filling machine (not shown in greater detail) which is symbolically represented only by a wall portion 11. Arranged on the outer periphery of the filling pipe 10 is a packaging casing supply 12 which is compressed together in a caterpillar-like fashion and which in a known manner is withdrawn from the filling pipe 10 by a braking ring 16 arranged near the mouth opening 14 on the filling pipe 10. As is known, withdrawal of the packaging casing supply from the filling pipe 10 is effected by the pressure of the ejection of filling material into the tubular or packaging casing which has been previously closed at one end by means of a closure clip 18.

When the packaging casing is filled with the desired and/or preset amount of filling material, the constriction and closure operation begins, using the closure device 20. In that case at least two and in the illustrated embodiment shown in FIG. 1 more precisely three pairs of constriction elements 21, 22, 23 are brought together in a scissor-like fashion. In that way they radially constrict the filled tubular casing. Thereupon the spreading displacement begins, by at least two pairs of the constriction elements 21, 22 being moved axially away from each other. In that way, an unfilled packaging portion 24 is produced, insofar as packaging casing material without a filling is withdrawn from the supply 12. Then, two closure elements 18, 19 are fitted in mutually juxtaposed relationship to the plaited end portion of the tubular casing by means of two pairs of closure tools (punch member and female die, not shown), and closed around the plaited end portion. Finally the plaited end portion of the tubular casing is severed between the closure elements 18, 19 and the filled sausage 26 is thus individually separated off.

The sausage 26 with the filling material distribution which is still uneven in the axial direction is conveyed away by an actively driven transport belt 28 which is associated with the closure device 20. As an alternative to the transport belt 28 it is also possible to provide a (passive) chute which however is detrimental to an accurately defined feed of the sausage to the downstream-connected apparatus 30 for redistribution of the filling material.

The redistribution apparatus 30 comprises two conveyor belts 32, 34 which are arranged in substantially parallel relationship on a support frame 36. The conveyor belts 32, 34 each have first mutually facing belt portions 38 and 40 respectively and a respective associated drive 42 and 44. The drives drive the conveyor belts in such a way that they convey away from the closure device 20 in substantially synchronous relationship with the mutually facing belt portions 38, 40. That is symbolically indicated by the direction arrows 46, 48.

The support frame 36 carries a carrier structure which is shown in simplified form in this view, in the form of two vertical carrier elements or bars 64, 66 which are displaced in the conveyor direction and on which the upper conveyor belt 32 is respectively independently displaceably arranged. The conveyor belts can be moved by displacement on the bars 64, 66 relative to each other and transversely with respect to the conveyor direction (vertically) on the one hand parallel towards each other and away from each other. That is symbolically indicated by the double-headed arrow 50. On the other hand however the conveyor belts can also be inclined relative to each other in the conveyor direction in such a way that it is possible to set a positioning angle of a desired value, as symbolically indicated by the double-headed arrow 52. For that purpose, the upper conveyor belt 32 can be displaced in a manner which is not shown in greater detail along a respective slot 68 and 70 in each of the bars 64 and 66 respectively either at the front, at the rear (in relation to the conveyor direction) or at both ends, in a vertical direction, and can be arrested in the desired position by means of two clamping levers 76, 78. In the arrangement shown in FIG. 1 the two conveyor belts 32, 34 are placed at an acute angle relative to each other so that the minimum through-passage cross-section 54 occurs at the end of the conveyor belts.

In an entry region one of the conveyor belts, here the upper conveyor belt 32, has a second belt portion 56 which is arranged upstream of the first belt portion 38 and which converges towards the lower conveyor belt 34 at an angle which is larger than the inclined positioning angle between the two first mutually facing belt portions 38, 40. Unlike the situation shown in FIG. 1, the two conveyor belts may also have inclined second belt portions, whereby the entry region assumes a funnel-like shape. The sausage 26 which is fed thereto by the transport belt 28, with the filling material therein being unevenly distributed therein, is securely engaged in the entry region by the two conveyor belts 32, 34 and drawn into the region of the first belt portions 38, 40.

Upon being conveyed through the apparatus 30 the sausage is then narrowed to the through-passage cross-section 54 at the end of the conveyor belts. In that step the filling material is distributed within the sausage casing uniformly over its entire length if the through-passage cross-section 54, the filling amount, the caliber and the length of the sausage are correctly matched to each other.

The sausage 58 which has been re-shaped in that way is discharged at the exit end from the conveyor belts 32, 34 to a downstream-disposed shaping box 60 which, as is shown here, is supported on a support frame 62.

FIG. 2 shows the conveyor belts 32, 34 in section in the region of the first belt portion in a plane perpendicular to the conveyor direction. The mutually facing first belt portions of the conveyor belts of the redistribution apparatus according to the invention are preferably (but not necessarily) oriented horizontally and parallel to each other in that plane. It will be seen that the conveyor belts are arranged at both sides on the bars 64, 66 of the common carrier structure so that sufficient rigidity is achieved for the apparatus in order to be able to exert sufficiently high forces for re-shaping the sausage depending on the respective tenacity of the sausage meat or filling material.

The invention claimed is:

1. Apparatus for redistributing pasty filling material in a closed, individually separated packaging casing in tube or bag form, the apparatus comprising:
   at least two conveyor belts, an upper conveyor belt and a lower conveyor belt, having mutually facing first belt portions so that a through-passage cross-section is formed between the first belt portions, the first belt portions being positioned at a first angle relative to one another, the at least two conveyor belts being adapted for redistributing a pasty filling material;
   the upper conveyor belt having a second belt portion extending at an angle relative to the first belt portion, the second belt portion being adjacent to the first belt portion, the angle of the second belt portion relative to the first belt portion being larger than the first angle, and
   a drive for the at least two conveyor belts which is capable of driving the at least two conveyor belts with the mutually facing belt portions substantially synchronously in a conveyor direction.

2. The apparatus of claim 1, wherein the at least two conveyor belts are positionable relative to each other in such a way that the through-passage cross-section narrows in the conveyor direction.

3. The apparatus of claim 1 further comprising an entry region of the at least two conveyor belts, wherein the entry region is enlarged in relation to the through-passage cross-section and the entry region narrows in the conveyor direction to the through-passage cross-section.

4. The apparatus of claim 1, wherein the at least two conveyor belts are arranged on a common carrier structure, wherein at least one of the conveyor belts is held by at least two carrier elements which are displaced in the conveyor direction and which are displaceable independently transversely with respect to the conveyor direction and by means of which both the through-passage cross-section and also the inclined position of the conveyor belts relative to each other can be varied.

5. A manufacturing installation for sausages filled with pasty filling material comprising
   a filling pipe through which the filling material can be introduced into a packaging casing in tube or bag form which is fed over the outer periphery of the filling pipe, a closure device arranged downstream of the filling pipe mouth opening for dividing up and closing a sausage by means of closure clips and individually separating the closed sausage, a redistribution device for redistributing past filling material comprising at least two conveyor belts, an upper conveyor belt and a lower conveyor belt, having mutually facing first belt portions so that a through-passage cross-section is formed between the first belt portions, the first belt portions are positioned at a first angle relative to one another, the upper conveyor belt having a second belt portion extending at an angle relative to the first belt portion, the second belt portion being adjacent to the first belt portion, the angle of the second belt portion relative to the first belt portion being larger than the first angle, and a drive for the at least two conveyor belts which is capable of driving the at least two conveyor belts with the mutually facing belt portions substantially synchronously in a conveyor direction; and a separate transport conveyor positioned between the closure device and the redistribution device.

6. The manufacturing installation of claim 5 further comprising a transport belt for conveying away and feeding the closed sausage, the transport belt positioned between the closure device and the redistribution device.

7. The manufacturing installation of claim 5 further comprising a shaping box for shaping the sausage is disposed downstream of the redistribution device.

8. A method of redistributing pasty filling in a closed, individually separated packaging casing of tube or bag form, comprising the steps of:

arranging at least two conveyor belts, an upper conveyor belt and a lower conveyor belt, to have mutually facing first belt portions, so that a through-passage cross-section is formed between the first belt portions, the first belt portions being positioned at a first angle relative to one another; and arranging the upper conveyor belt to have a second belt portion extending at an angle relative to the first belt portion, the second belt portion being adjacent to the first belt portion, the angle of the second belt portion relative to the first belt portion being larger than the first angle;

arranging a separate conveyor adjacent the at least two conveyor belts and transporting a closed and individually separated packaging casing filled with pasty filling to the at least two conveyors on the separate conveyor;

introducing the closed and individually separated packaging casing filled with pasty filling material into the at least two conveyor belts having mutually facing first belt portions; and conveying the packaging casing through a through-passage cross-section which is formed between the first belt portions and which is of such a dimension that in the conveying operation, the filling material is distributed substantially over the entire length of the closed packaging casing of tube or bag form.

\* \* \* \* \*